United States Patent [19]

Henk

[11] Patent Number: 4,777,247
[45] Date of Patent: Oct. 11, 1988

[54] HEAVY METAL-CONTAINING MONOAZO DYES

[75] Inventor: Hermann Henk, Cologne, Fed. Rep. of Germany

[73] Assignee: Bayer Aktiengesellschaft, Leverkusen, Fed. Rep. of Germany

[21] Appl. No.: 34,870

[22] Filed: Apr. 6, 1987

[30] Foreign Application Priority Data

Apr. 10, 1986 [DE] Fed. Rep. of Germany ....... 3612016

[51] Int. Cl.[4] .................... C09B 45/18; C09B 45/12; C09B 62/012; D06P 1/10
[52] U.S. Cl. .................... 534/622; 534/602; 534/603; 534/605; 534/619; 534/620; 534/624; 534/626; 534/627; 534/628; 534/629; 534/638; 534/641; 534/642; 534/643; 534/720; 534/722
[58] Field of Search ............... 534/619, 622, 627, 628, 534/626, 629, 720, 722, 620

[56] References Cited

U.S. PATENT DOCUMENTS

| | | | |
|---|---|---|---|
| 3,125,561 | 3/1964 | Beffa et al. | 534/581 X |
| 3,551,170 | 12/1970 | Kuster | 534/696 X |
| 4,077,953 | 3/1978 | McCrae et al. | 534/581 X |
| 4,086,223 | 4/1978 | Steiner et al. | 534/637 X |

FOREIGN PATENT DOCUMENTS

| | | | |
|---|---|---|---|
| 0142104 | 5/1985 | European Pat. Off. | 534/619 |
| 0144776 | 6/1985 | European Pat. Off. | 534/619 |
| 1504940 | 12/1966 | France | 534/697 |
| 1162242 | 8/1969 | United Kingdom | 534/619 |

Primary Examiner—Floyd D. Higel
Attorney, Agent, or Firm—Sprung Horn Kramer & Woods

[57] ABSTRACT

A dyestuff which, in the form of its free acid, corresponds to the formula

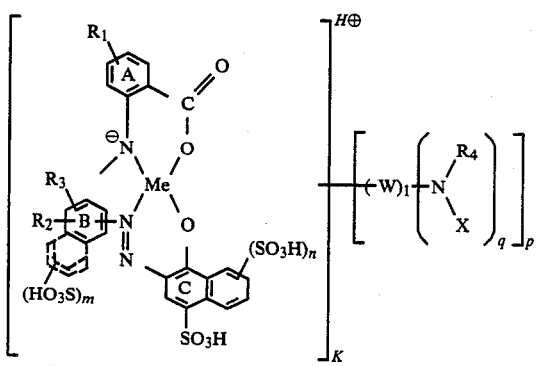

wherein
 W=a direct bond or a bridge member to a C atom of the naphthalene nucleus C or the benzene nucleus A, wherein the bridge member is

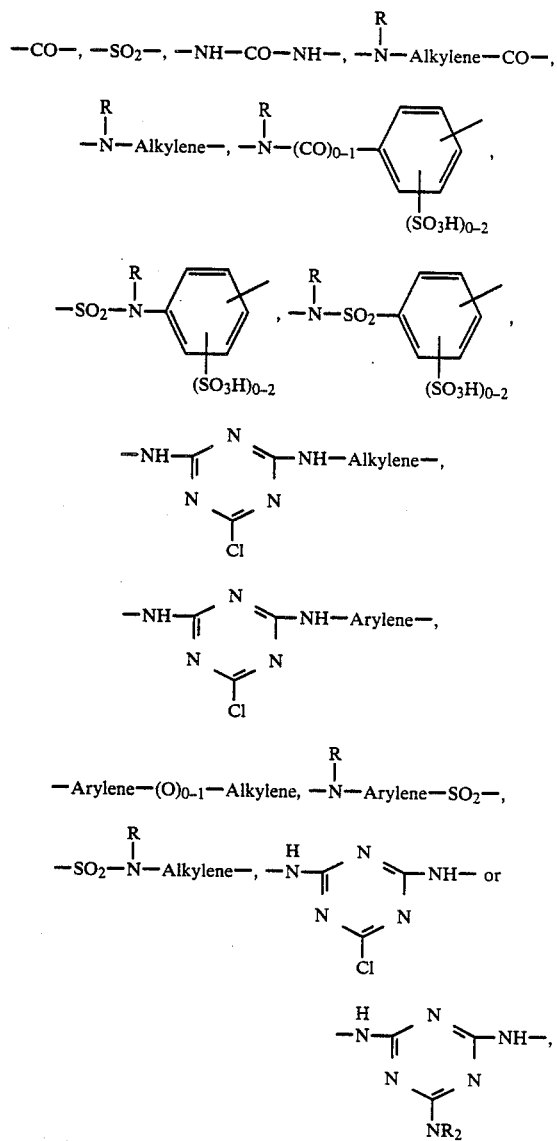

wherein
R=H or $C_1$-$C_4$-alkyl,
alkylene=$C_2$-$C_5$-alkylene and
arylene=unsubstituted or substituted phenylene,
$R_1$, $R_2$ and $R_3$=H—, $C_1$-$C_4$-alkyl, $C_1$-$C_4$-alkoxy, hydroxyl, halogen, carboxyl, sulphonamido, nitro, alkyl or arylcarbonylamino, —$SO_3H$, —$SO_2$—CH=$CH_2$ or —$SO_2CH_2$—$CH_2$—Z,
wherein
Z=—$OSO_3H$, —$SSO_3H$, $OPO_3H_2$, —$OCOCH_3$, dialkylamino, or quaternary ammonium
$R_4$=H or $C_1$-$C_4$-alkyl which is unsubstituted or substituted by $C_1$-$C_4$-alkoxy, —$OSO_3H$, —$SO_3H$, —COOH or hydroxyl.
X=a fibre-reactive radical,
p=1 or 2,
q=0 or 1,
l, m and n=0 or 1,
k=1 or 2 and
Me=Cu.

8 Claims, No Drawings

HEAVY METAL-CONTAINING MONOAZO DYES

The present invention relates to dyestuffs which, in the form of the free acid, correspond to the formula

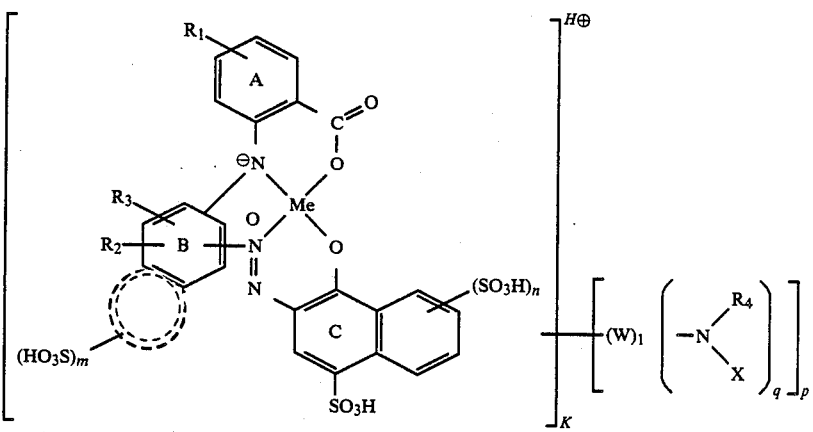

wherein
- W = a direct bond or a bridge member to a C atom of the napthalene nucleus C or the benzene nucleus A,
- $R_1$, $R_2$ and $R_3$ = H—, $C_1$-$C_4$-alkyl, $C_1$-$C_4$-alkoxy, hydroxyl, halogen, carboxyl, sulphonamido, nitro, alkyl or arylcarbonylamino, —$SO_3H$, —$SO_2$—$CH=CH_2$ or —$SO_2$—$CH_2$—$CH_2$—Z, wherein
- Z = a leaving group,
- $R_4$ = H or $C_1$-$C_4$-alkyl which is optionally substituted by $C_1$-$C_4$-alkoxy, —$OSO_3H$, —$SO_3H$, —COOH or hydroxyl,
- X = a fibre-reactive radical,
- p = 0, 1 or 2,
- q = 0 or 1,
- l, m and n = 0 or 1,
- K = 1 or 2 and
- Me = a divalent metal atom, such as Fe, Cu, Zn, Co or Ni, preferably Cu, and processes for their preparation and their use for dyeing and printing natural and synthetic textile and non-textile materials.

Examples of suitable leaving groups Z are —O—$SO_3H$, —S—$SO_3H$, —O—$PO_3H_2$, —$OCOCH_3$, dialkylamino and quaternary ammonium groups.

Examples of suitable alkylcarbonylamino groups are $C_1$-$C_4$-alkylcarbonylamino groups, particularly suitable arylcarbonylamino groups are optionally substituted phenylcarbonylamino groups and particularly suitable sulphonamino groups are sulphonamide and sulphonic acid mono- and sulphonic acid di-$C_1$-$C_4$-alkylamide.

Examples of suitable bridge members W are —CO—, —$SO_2$—, —NH—CO—NH—,

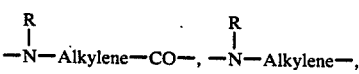

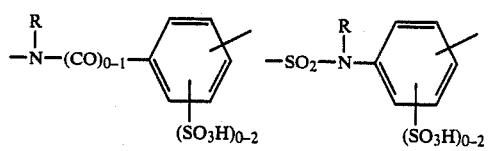

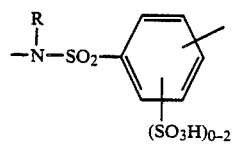

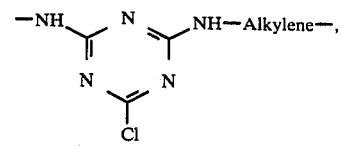

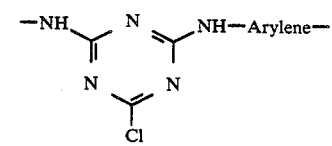

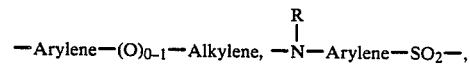

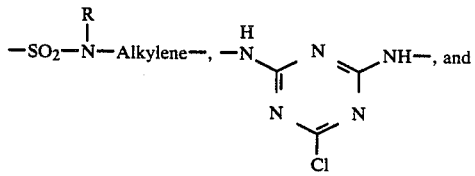

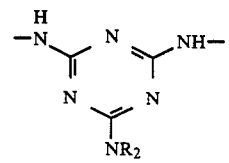

wherein
- R preferably = H or $C_1$-$C_4$-alkyl,
- Alkylene preferably denotes $C_2$-$C_5$-alkylene and
- Arylene preferably denotes optionally substituted phenyl.

Suitable fibre-reactive radicals, that is to say those which react with the OH or NH groups of the fibres under dyeing conditions to form covalent bonds, are, in particular, those which contain at least one reactive substituent bonded to a 5- or 6-membered aromatic-heterocyclic ring, for example to a monoazine, diazine or triazine ring, in particular a pyridine, pyrimidine, pyridazine, pyrazine, thiazine, oxazine or asymmetric or symmetric triazine ring, or to such a ring system which has one or more fused-on aromatic-carbocyclic rings, for example a quinoline, phthalazine, cinnoline, quinazoline, quinoxaline, acridine, phenazine or phenanthridine ring system.

Examples which may be mentioned of the reactive substituents on the heterocyclic radical are halogen (Cl, Br or F), ammonium, including hydrazinium, sulphonium, sulphonyl, azido-(N₃), thiocyanato, thio, thiolether, oxy-ether, sulphinic acid and sulphonic acid.

Examples which may be mentioned specifically are: 2,4-difluorotriazin-6-yl, 2,4-dichlorotriazin-6-yl and mono-halogeno-sym.-triazinyl radicals, in particular monochloro- and monofluorotriazinyl radicals, which are substituted by alkyl, aryl, amino, monoalkylamino, dialkylamino, aralkylamino, arylamino, alkoxy, aryloxy, alkylthio or arylthio, alkyl preferably denoting optionally substituted $C_1$-$C_4$-alkyl, aralkyl preferably denoting optionally substituted phenyl-$C_1$-$C_4$-alkyl and aryl preferably denoting optionally substituted phenyl or naphthyl, and preferred substituents for alkyl being hydroxyl, cyano, $C_1$-$C_4$-alkoxy, carboxyl, sulpho or sulphato and for phenyl and naphthyl being sulpho, $C_1$-$C_4$-alkyl, $C_1$-$C_4$-alkoxy, carboxyl, halogen or acylamino.

The following radicals may be mentioned specifically: 2-amino-4-fluoro-triazin-6-yl, 2-methylamino-4-fluorotriazin-6-yl, 2-ethylamino-4-fluorotriazin-6-yl, 2-isopropylamino-4-fluoro-triazin-6-yl, 2-dimethylamino-4-fluorotriazin-6-yl, 2-diethylamino-4-fluoro-triazin-6-yl, 2-β-methoxy-ethylamino-4-fluoro-triazin-6-yl, 2-β-hydroxyethylamino-4-fluoro-triazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluorotriazin-6-yl, 2-carboxymethylamino-4-fluoro-triazin-6-yl, 2-di-(carboxymethylamino)-4-fluoro-triazin-6-yl, 2-sulphomethylmethylamino-4-fluoro-triazin-6-yl, 2-β-cyanoethylamino-4-fluoro-triazin-6-yl, 2-benzylamino-4-fluorotriazin-6-yl, 2-β-phenylethylamino-4-fluoro-triazin-6-yl, 2-benzyl-methylamino-4-fluoro-triazin-6-yl, 2-(x-sulphobenzyl)-amino-4-fluoro-triazin-6-yl, 2-cyclohexylamino-4-fluoro-triazin-6-yl, 2-(o-, m- or p-methylphenyl)-amino-4-fluoro-triazin-6-yl, 2-(o-, m- or p-sulphophenyl)-amino-4-fluoro-triazin-6-yl, 2-(2',5'-disulphophenyl)-amino-4-fluoro-triazin-6-yl, 2-(o-, m- or p-chlorophenyl)-amino-4-fluoro-triazin-6-yl, 2-(o-, m- or p-methoxyphenyl)-4-fluoro-triazin-6-yl, 2-(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino-4-fluoro-triazin-6-yl, 2-(2'-chloro-5'-sulphophenyl)-amino-4-fluoro-triazin-6-yl, 2-(2'-methoxy-4'-sulphophenyl)-amino-4-fluoro-triazin-6-yl, 2-(o-, m- or p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4'-sulphophenyl)-amino-4-fluoro-triazin-6-yl, 2-(2'-carboxy-5'-sulphophenyl)-amino-4-fluoro-triazin-6-yl, 2-(6'-sulphonaphth-2'-yl)-amino-4-fluoro-triazin-6-yl, 2-(4',8'-disulphonaphth-2'-yl)-amino-4-fluoro-triazin-6-yl, 2-(6',8'-disulphonaphth-2'-yl)-amino-4-fluoro-triazin-6-yl, 2-(N-methylphenyl)-amino-4-fluoro-triazin-6-yl, 2-(N-ethylphenyl)-amino-4-fluoro-triazin-6-yl, 2-(N-β-hydroxyethylphenyl)-amino-4-fluoro-triazin-6-yl, 2-(N-isopropylphenyl)-amino-4-fluoro-triazin-6-yl, 2-morpholino-4-fluoro-triazin-6-yl, 2-piperidino-4-fluoro-triazin-6-yl, 2-(4',6',8'-trisulphonaphth-2'-yl)-4-fluoro-triazin-6-yl, 2-(3',6',8'-trisulphonaphth-2'-yl)-4-fluoro-triazin-6-yl, 2-(3',6'-disulphonaphth-1'-yl)-4-fluoro-triazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotrizin-6-yl)-carbamyl, N-methyl- or N-ethyl-N-(2,4-dichlorotriazin-6-yl)-aminoacetyl, 2-methoxy-4-fluoro-triazin-6-yl, 2-ethoxy-4-fluoro-triazin-6-yl, 2-phenoxy-4-fluorotriazin-6-yl, 2-(o-, m- or p-sulphophenoxy)-4-fluoro-triazin-6-yl, 2-(o-, m- or p-methyl- or -methoxy-phenoxy)-4-fluoro-triazin-6-yl, 2-β-hydroxyethylmercapto-4-fluoro-triazin-6-yl, 2-phenylmercapto-4-fluoro-triazin-6-yl, 2-(4'-methylphenyl)-mercapto-4-fluoro-triazin-6-yl, 2-(2',4'-dinitrophenyl)-mercapto-4-fluoro-triazin-6-yl, 2-methyl-4-fluoro-triazin-6-yl, 2-phenyl-4-fluorotriazin-6-yl and the corresponding 4-chloro- and 4-bromo-triazinyl radicals and the corresponding radicals obtainable by replacement of halogen with tertiary bases, such as trimethylamine, triethylamine, dimethyl-β-hydroxyethylamine, triethanolamine, N,N-dimethylhydrazine, pyridine, - or -picoline, nicotinic acid or isonicotinic acid, sulphinates, in particular benzenesulphinic acid, or bisulphite.

Mono-, di- or trihalogenopyrimidinyl radicals, such as 2,4-dichloropyrimidin-6-yl, 2,3,5-trichloropyrimidin-6-yl, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carboalkoxy-pyrimidin-6-yl, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloro-quinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloro-6'-pyridazon-1'-yl)-phenylsulphonyl or -carbonyl, β-(4',5'-dichloro-6'-pyridazon-1'-yl)-ethylcarbonyl, N-methyl-N-(2,3-dichloroquinoxaline-6-sulphonyl)-aminoacetyl, N-methyl-N-(2,3-dichloroquinoxaline-6-carbonyl)-aminoacetyl and the corresponding bromine and fluorine derivatives of the abovementioned chlorine-substituted heterocyclic radicals, and of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4- pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2-fluoro-4-dichloromethyl-5-chloropyrimidin-6-yl and 2-fluoro-5-chloropyrimidin-4-yl; 2-methyl-4-fluoro-5-methylsulphonyl-pyrimidin-6-yl; 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazin-6-yl, 2-(3′-carboxyphenyl)-sulphonyl-4-chlorotriazin-6-yl, 2-(3′-sulphophenyl)-sulphonyl-4-chlorotriazin-6-yl and 2,4-bis-(3′-carboxyphenylsulphonyl)-triazine-6-yl; pyrimidine rings containing sulphonyl groups, such as 2-carboxymethylsulphonyl-pyrimidin-4-yl, 2-methylsulphonyl-6-methyl-pyrimidin-4-yl, 2-methylsulphonyl-6-ethylpyrimidin-4-yl, 2-phenylsulphonyl-5-chloro-6-methyl-pyrimidin-4-yl, 2,6-bis-methylsulphonyl-pyrimidin-4-yl, 2,6-bis-methylsulphonyl-5-chloro-pyrimidin-4-yl, 2,4-bis-methylsulphonyl-pyrimidine-5-sulphonyl, 2-methylsulphonyl-pyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methyl-sulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methylpyrimidine-5-sulphonyl, 2-methylsulphonyl-5-nitro-6-methylpyrimidin-4-yl, 2,5,6-tris-methylsulphonyl-pyrimidin-4-yl, 2-methylsulphonyl-5,6-dimethyl-pyrimidin-4-yl, 2-ethylsulphonyl-5-chloro-6-methyl-pyrimidin-4-yl, 2-methylsulphonyl-6-chloropyrimidin-4-yl, 2,6-bis-methylsulphonyl-5-chloropyrimidin-4-yl, 2-methylsulphonyl-6-carboxypyrimidin-4-yl, 2-methylsulphonyl-5-sulpho-pyrimidin-4-yl, 2-methylsulphonyl-6-carbomethoxy-pyrimidin-4-yl, 2-methylsulphonyl-5-carboxy-pyrimidin-4-yl, 2-methylsulphonyl-5-cyano-6-methoxy-pyrimidin-4-yl, 2-methylsulphonyl-5-chloro-pyrimidin-4-yl, 2-sulphoethylsulphonyl-6-methyl-pyrimidin-4-yl, 2-methylsulphonyl-5-bromo-pyrimidin-4-yl, 2-phenyl-sulphonyl-5-chloro-pyrimidin-4-yl, 2-carboxymethylsulphonyl-5-chloro-6-methyl-pyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)pyrimidine-5-sulphonyl, 2-methylsulphonyl-4-chloro-6-methylpyrimidine-5-sulphonyl or -carbonyl; 2-chlorobenzothiazole-5- or -6-carbonyl or -5- or -6-sulphonyl, 2-arylsulphonyl- or -alkylsulphonylbenzothiazole-5- or -6-carbonyl or -5- or -6-sulphonyl, such as 2-methylsulphonyl- or 2-ethylsulphonylbenzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives containing sulpho groups in the fused-on benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methyl-1,3-thiazole-5-carbonyl or -4-or -5-sulphonyl and the N-oxide of 4-chloro- or 4-nitroquinoline-5-carbonyl.

Reactive groups of the aliphatic series may furthermore be mentioned, such as acryloyl, mono-, di- or trichloroacryloyl, such as —Co—CH=CH—Cl, —CO—CCl=CH$_2$ or —CO—CCl=CH—CH$_3$, and furthermore —CO—CCl=CH—COOH, —CO—CH=CCl—COOH, β-chloropropionyl, 3-phenylsulphonylpropionyl, 3-methylsulphonylpropionyl, 2-fluoro-2-chloro-3,3-difluorocyclobutane-1-carbonyl, 2,2,3,3-tetrafluorocyclobutane-1-carbonyl or -sulphonyl, β-(2,2,3,3-tetrafluorocyclobut-2-yl)-aryloxy, α- or β-bromoacryloyl, and α- or β-alkyl- or -arylsulphoacryloyl group, such as α- or β-methylsulphonylacryloyl, chloroacetyl, vinylsulphonyl or —SO$_2$CH$_2$CH$_2$Z, wherein Z=a group which can be split off under alkaline conditions, in particular —OSO$_3$H, —OCOCH$_3$, —SSO$_3$H, —OPO$_3$H$_2$, —OCOC$_6$H$_5$, di-C$_1$-C$_4$-alkylamino or quaternary ammonium, in particular —N$^⊕$(C$_1$-C$_4$-alkyl)$_3$X$^⊖$,

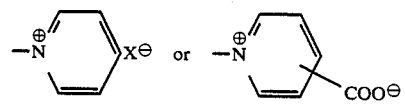

where

X=an anion, for example —OSO$_3$H, —OPO$_3$H$_2$, —Cl, —Br, —F, —SCN—OCN, —OSO$_3$CH$_3$, —OSO$_2$C$_6$H$_5$ or OCO—CH$_3$.

Preferred dyestuffs (I) are those of the formulae

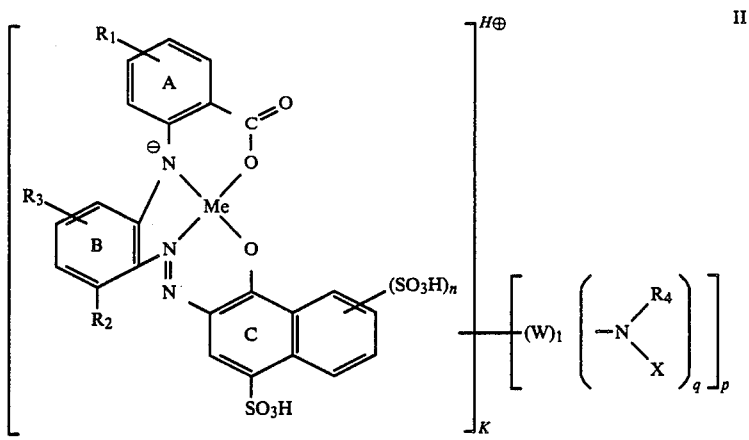

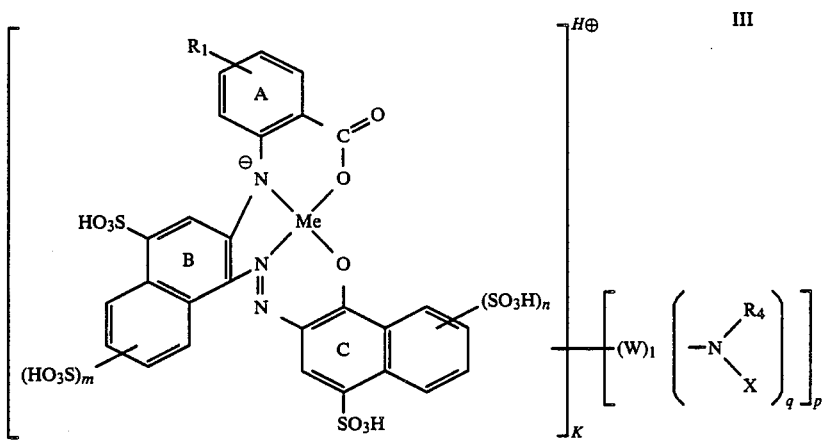

and those of the formulae I–III where
  K=1 and
  q, l, m, n and p=0 (these dyestuffs are particularly suitable as dyestuffs for wool, polyamide and leather)
furthermore those where
  K=2
  p and l=1
  q and m=0 (these dyestuffs are particularly suitable as direct dyestuffs)
and those where
  q, k and p=1 and
  l and m=0
(these dyestuffs are particularly suitable as reactive dyestuffs for wool and polyamide, but in particular for cellulose fibres, such as cotton).

Preferred reactive dyestuffs here are those of the formula

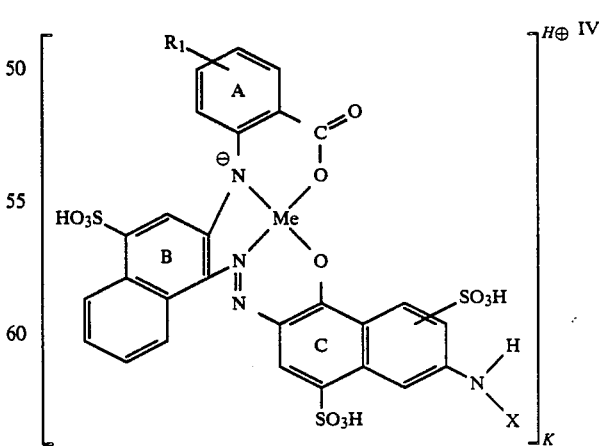

The dyestuffs of the formula I are obtained, for example, by reaction of an ortho-halogeno-azo compound of the formula

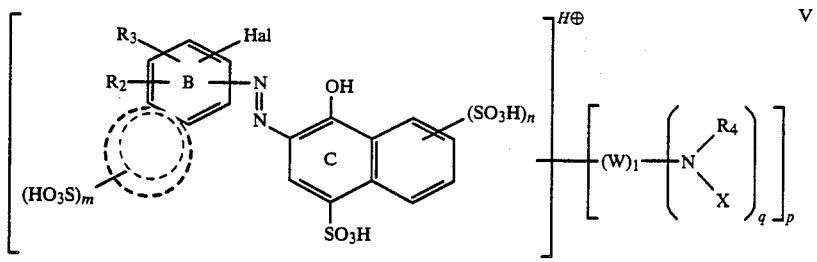

(which are in turn obtainable by coupling of diazotized amines of the formula

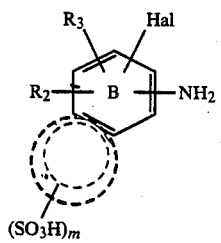

with coupling components of the formula

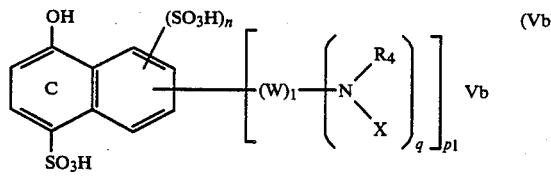

with an ortho-aminobenzoic acid derivative of the formula

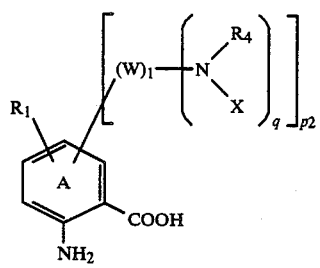

wherein $p_1$ and $p_2 = 0$ or $1$, in the presence of metal-donating agents, in particular the corresponding metal salts, preferably the sulphates, acetates or chlorides, if appropriate with the addition of catalytic amounts of a copper(I) salt, such as copper-I chloride.

The reaction is preferably carried out in a neutral to weakly alkaline aqueous or aqueous-organic medium at room temperature to slightly elevated temperature. It proceeds with high yields.

Examples of suitable compounds Va are: 2,4,6-trichloroaniline, 2,4-dinitro-6-chloroaniline, 2,4-dinitro-6-bromoaniline, 2,6-dichloro-4-nitroaniline, 2,6-dibromo-4-nitroaniline, 2-bromo-6-chloro-4-nitroaniline, 2,6-dibromo-4-methylaniline, 2,6-dibromo-4-(β-sulphatoethylsulphonyl)-aniline, 4,6-dichloroaniline-2-sulphonic acid, 5-chloro-6-aminotoluene-3-sulphonic acid, 1-amino-2-bromonaphthalene-4-sulphonic acid, 1-amino-2-bromonaphthalene-4,6-disulphonic acid and 1-amino-2-bromonaphthalene-4,7-disulphonic acid.

Examples of suitable compounds Vb are: 1-hydroxynaphthalene-4-sulphonic acid, 1-hydroxynaphthalene-4,8-disulphonic acid, 1-hydroxy-8-(X-amino)naphthalene-4,6-disulphonic acid, 1-hydroxy-6-(X-amino)naphthalene-4,8-disulphonic acid, 1-hydroxy-6-(X-amino)-naphthalene-4-sulphonic acid, 1-hydroxy-7-(X-amino)-naphthalene-4-sulphonic acid, 6,6'-(carbonyldiimino)-bis[1-hydroxynaphthalene-4-sulphonic acid] and 6,6'-(carbonyldiimino)bis[1-hydroxynaphthalene-4,8-disulphonic acid].

X here represents a fibre-reactive radical, in particular one of the abovementioned radicals.

Examples of suitable compounds of the generaly formula VI are: 2-aminobenzoic acid, 2-amino-4-chlorobenzoic acid, 2-amino-5-chlorobenzoic acid, 2-amino-6-chlorobenzoic acid, 2-amino-4-nitrobenzoic acid, 2-amino-5-nitrobenzoic acid, 2-amino-4-(acetylamino)-benzoic acid, 2-amino-5-(acetylamino)-benzoic acid, 5,5'-(carbonyldiimino)bis[2-aminobenzoic acid], benzidine-3,3'-dicarboxylic acid, 2-amino-5-sulphobenzoic acid, 2-amino-4-sulphobenzoic acid, 2-amino-4-(aminosulphonyl)-benzoic acid, 2-amino-4-(X-amino)-benzoic acid and 2-amino-5-(x-amino)benzoic acid.

The formulae given are those of the free acids. The dyestuffs are in general employed in the form of their salts, in particular the alkali metal or ammonium salts.

The dyeings and prints obtainable with the dyestuffs according to the invention, in particular those on cotton and cellulose, are distinguished by good fastness, in particular very good fastness to wet processing and light.

EXAMPLE 1

302 parts of 2-bromo-1-aminonaphthalene-4-sulphonic acid are dissolved in about 2 liters of water and are diazotized by customary processes. 467.5 parts of 1-hydroxy-6-(2,4-difluoro-5-chloropyrimidin-6-yl)aminonaphthalene-4,8-disulphonic acid are stirred in about 3.5 liters of water. This initial mixture is allowed to run into the above diazo solution, with vigorous stirring, and at the same time a pH value of 7–8 is maintained with about 800 parts of a 20% strength sodium carbonate solution. Coupling ends rapidly. Most of the red coupling product has precipitated. 275 parts of 2-aminobenzoic acid are slowly added to this suspension and at the same time the pH value of 7–8 is kept constant with about 1,000 parts of a 20% strength sodium carbonate solution. 1,380 parts of an 18% strength copper sulphate solution are then added dropwise, the pH value again being kept at 7–8 by addition of 400 parts of a 20% strength sodium carbonate solution. After the mixture has been stirred for several hours it is filtered and the dyestuff is separated out of the filtrate by addition of NaCl.

The dyestuff precipitated is filtered off and dried. About 1,000 parts of a dyestuff which, in the form of the free acid, corresponds to the following formula are obtained.

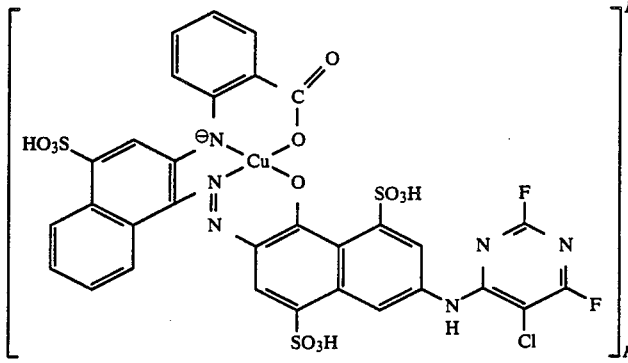

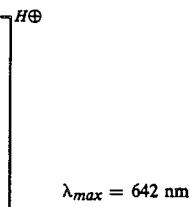

$\lambda_{max} = 642$ nm

The dyestuff dissolves in water giving a dark green-coloured solution, and gives green dyeings and prints of very high fastness on cellulose materials.

Other dyestuffs which are obtained when B—NH₂ is diazotized, the diazotization product is coupled to C—OH and the coupling product is reacted with an O-aminocarboxylic acid A—NH₂ in the presence of copper(II) salts analogously to Example 1 are described in the following table.

TABLE I

| Example No. | B—NH₂ | C—OH | A—NH₂ | $\lambda_{max}$[nm] | Substrate/shade |
|---|---|---|---|---|---|
| 2 | 1-amino-2-bromo-4-sulfonaphthalene | 2-[(2,6-difluoro-5-chloropyrimidin-4-yl)amino]-5-hydroxy-8-sulfonaphthalene (structure shown) | 2-aminobenzoic acid (anthranilic acid) | 628 | C/bluish-tinged green |
| 3 | 1-amino-2-bromo-4-sulfonaphthalene | 8-[(2,6-difluoro-5-chloropyrimidin-4-yl)amino]-5-hydroxy-naphthalene-1,6-disulfonic acid (structure shown) | 2-aminobenzoic acid | 644 | C/dull green |
| 4 | 1-amino-2-bromo-4-sulfonaphthalene | 2-[(2-fluoro-5-chloro-6-methylpyrimidin-4-yl)amino]-5-hydroxy-naphthalene-4,8-disulfonic acid (structure shown) | 2-aminobenzoic acid | 642 | C/green |
| 5 | 1-amino-2-bromo-4-sulfonaphthalene | 2-[(2-fluoro-5-chloro-6-methylpyrimidin-4-yl)amino]-5-hydroxy-naphthalene-4,8-disulfonic acid (structure shown) | 4-amino-3-carboxy-benzenesulfonic acid | 640 | C/green |
| 6 | 1-amino-2-bromo-4-sulfonaphthalene | 2-[(2-fluoro-5-chloro-6-methylpyrimidin-4-yl)amino]-5-hydroxy-naphthalene-4,8-disulfonic acid (structure shown) | 3-amino-4-carboxy-benzenesulfonic acid | 638 | C/green |

TABLE I-continued

| Example No. | B—NH₂ | C—OH | A—NH₂ | $\lambda_{max}$[nm] | Substrate/shade |
|---|---|---|---|---|---|
| 7 | 4-HO₃S, 2-Br, 1-NH₂ naphthalene | 1-OH, 4,8-di-SO₃H naphthalene with 6-NH-C(=O)-C₆H₅ | 2-NH₂, benzoic acid (COOH) | 642 | wool, PA, leather → green |
| 8 | 4-HO₃S, 2-Br, 1-NH₂ naphthalene | 1-OH, 4,8-di-SO₃H naphthalene with 6-NH-triazine (difluoro) bearing NH-C₆H₄-SO₃H | 2-NH₂ benzoic acid | 642 | C/green |
| 9 | 4-HO₃S, 2-Br, 1-NH₂ naphthalene | 1-OH, 4,8-di-SO₃H naphthalene with 6-NH-triazine (F, NH₂) | 2-NH₂, 5-SO₃H benzoic acid | 640 | C/green |
| 10 | 4-HO₃S, 2-Br, 1-NH₂ naphthalene | 1-OH, 4,8-di-SO₃H naphthalene with 6-NH-triazine (F, NH₂) | 2-NH₂, 4-SO₃H benzoic acid | 638 | C/green |
| 11 | 4-HO₃S, 2-Br, 1-NH₂ naphthalene | 1-OH, 4,8-di-SO₃H naphthalene with 6-NH-triazine (Cl, NH₂) | 2-NH₂ benzoic acid | 642 | C/green |

TABLE I-continued

| Example No. | B—NH₂ | C—OH | A—NH₂ | $\lambda_{max}$[nm] | Substrate/ shade |
|---|---|---|---|---|---|
| 12 | 4-amino-3-bromo-naphthalene-1-sulfonic acid | 1-hydroxy-8-[(5-dichlorofluoromethyl-6-chloro-4-fluoropyrimidin-2-yl)amino]naphthalene-3,6-disulfonic acid | anthranilic acid | 644 | C/green |
| 13 | 4-amino-3-bromo-naphthalene-1-sulfonic acid | 1-hydroxy-8-[(5-trichloromethyl-6-chloro-4-fluoropyrimidin-2-yl)amino]naphthalene-3,6-disulfonic acid | anthranilic acid | 644 | C/green |
| 14 | 4-amino-3-bromo-naphthalene-1-sulfonic acid | 1-hydroxy-8-[(5-trichloromethyl-6-chloro-4-fluoropyrimidin-2-yl)amino]naphthalene-3,6-disulfonic acid | 2-amino-5-sulfobenzoic acid | 642 | C/green |
| 15 | 4-amino-3-bromo-naphthalene-1-sulfonic acid | 1-hydroxy-8-[(5-trichloromethyl-6-chloro-4-fluoropyrimidin-2-yl)amino]naphthalene-3,6-disulfonic acid | 3-amino-4-sulfobenzoic acid | 640 | C/green |
| 16 | 4-amino-3-bromo-naphthalene-1-sulfonic acid | 1-hydroxy-8-[(5-chloro-4,6-difluoropyrimidin-2-yl)amino]naphthalene-3,6-disulfonic acid | anthranilic acid | | |

TABLE I-continued

| Example No. | B—NH₂ | C—OH | A—NH₂ | $\lambda_{max}$[nm] | Substrate/shade |
|---|---|---|---|---|---|
| 17 | 4-amino-3-bromo-1-naphthalenesulfonic acid | 2-(2-bromoacetamido)-5-hydroxy-naphthalene-1,6-disulfonic acid derivative | anthranilic acid (2-aminobenzoic acid) | 642 | Wool/green |
| 18 | 4-amino-3-bromo-1-naphthalenesulfonic acid | 2-acetamido-5-hydroxy-naphthalene-1,6-disulfonic acid derivative | anthranilic acid | 640 | Wool/leather/PA/green |
| 19 | 4-amino-3-bromo-1-naphthalenesulfonic acid | bis-acetamido naphthol disulfonic acid derivative | anthranilic acid | 648 | C/green |
| 20 | 4-amino-3-bromo-1-naphthalenesulfonic acid | dichloropyrazinyl-amino-benzamido naphthol sulfonic acid derivative | anthranilic acid | 642 | C/green |
| 21 | 4-amino-3-bromo-1-naphthalenesulfonic acid | 1-naphthol-4-sulfonic acid | anthranilic acid | 624 | Wool/blue-leather/green PA |

TABLE I-continued

| Example No. | B—NH₂ | C—OH | A—NH₂ | $\lambda_{max}$[nm] | Substrate/shade |
|---|---|---|---|---|---|
| 22 | 4-amino-3-bromo-1-naphthalenesulfonic acid | 2,5-disulfo-8-hydroxy-6-[(5-chloro-2,4-difluoropyrimidin-6-yl)amino]naphthalene | 2-amino-5-sulfobenzoic acid | 640 | C/green |
| 23 | 4-amino-3-bromo-1-naphthalenesulfonic acid | 2,5-disulfo-8-hydroxy-6-[(5-chloro-2,4-difluoropyrimidin-6-yl)amino]naphthalene | 2-amino-4-sulfobenzoic acid | 638 | C/green |
| 24 | 4-amino-3-bromo-6-sulfo-1-naphthalenesulfonic acid | 2,5-disulfo-8-hydroxy-6-[(5-chloro-2,4-difluoropyrimidin-6-yl)amino]naphthalene | anthranilic acid | 636 | C/green |
| 25 | 4-amino-3-bromo-7-sulfo-1-naphthalenesulfonic acid | 2,5-disulfo-8-hydroxy-6-[(5-chloro-2,4-difluoropyrimidin-6-yl)amino]naphthalene | anthranilic acid | 638 | C/green |
| 26 | 4-amino-3-bromo-1-naphthalenesulfonic acid | 4-sulfo-1-naphthol | bis(2-amino-5-sulfobenzoic acid) linked | 642 | C/green |

TABLE I-continued

| Example No. | B—NH₂ | C—OH | A—NH₂ | $\lambda_{max}$ [nm] | Substrate/ shade |
|---|---|---|---|---|---|
| 27 | 2,4,6-trichloroaniline | 5-OH, 4,8-diSO₃H, 2-NHCOCH₃ naphthalene | anthranilic acid (2-NH₂ benzoic acid) | 620 | Wool/PA/leather/green blue |
| 28 | 1-NH₂, 2-Br, 4-SO₃H naphthalene | 1-OH, 5-SO₃H naphthalene | 4-NH₂, 3-COOH, N-(difluorotriazinyl)amino-phenyl | | C/green |
| 29 | 1-NH₂, 2-Br, 4-SO₃H naphthalene | 1-OH, 5-SO₃H naphthalene | 4-NH₂, 3-COOH, N-(difluorotriazinyl)amino-phenyl | | C/green |
| 30 | 1-NH₂, 2-Br, 4-SO₃H naphthalene | 1-OH, 5-SO₃H naphthalene | 3-NH₂, 4-COOH, N-(difluorotriazinyl)amino-phenyl | | C/green |
| 31 | 1-NH₂, 2-Br, 4-SO₃H naphthalene | 1-OH, 5-SO₃H naphthalene | 3-NH₂, 4-COOH, N-(difluorotriazinyl)amino-phenyl | | C/green |

TABLE I-continued

| Example No. | B—NH₂ | C—OH | A—NH₂ | $\lambda_{max}$[nm] | Substrate/shade |
|---|---|---|---|---|---|
| 32 | naphthalene with HO₃S, Br, NH₂ | naphthalene with SO₃H, OH, SO₃H substituted with NH-pyrimidine (F, Cl, F, N, N) | pyrimidine (Cl, F, N, N) linked via NH to benzene with COOH, NH₂ | | C/green |
| 33 | naphthalene with HO₃S, Br, NH₂ | naphthalene with SO₃H, OH, SO₃H substituted with NH-pyrimidine (F, Cl, F, N, N) | pyrimidine (Cl, F, N, N) linked via NH to benzene with COOH, NH₂ | | C/green |
| 34 | naphthalene with HO₃S, Br, NH₂ | naphthalene with SO₃H, OH, SO₃H substituted with NH-triazine (F, NH₂, N, N) | triazine (Cl, F, N, N) linked via NH to benzene with COOH, NH₂ | | C/green |
| 35 | naphthalene with HO₃S, Br, NH₂ | naphthalene with SO₃H, OH, SO₃H substituted with NH-triazine (F, NH₂, N, N) | pyrimidine (Cl, F, N, N) linked via NH to benzene with COOH, NH₂ | | C/green |

C = Cotton
PA = Polyamide

I claim:

1. A dyestuff which, in the form of its free acid, corresponds to the formula

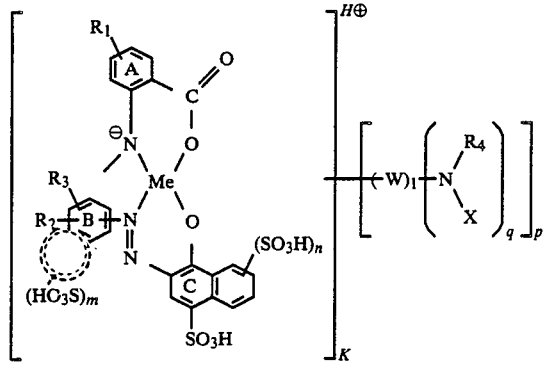

wherein

W = a direct bond or a bridge member to a C atom of the naphthalene nucleus C or the benzene nucleus A, wherein the bridge member is

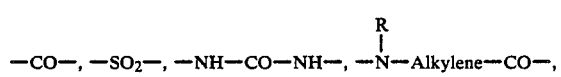

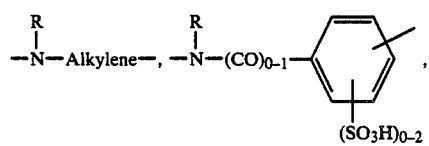

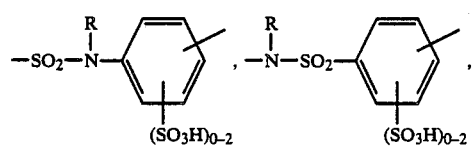

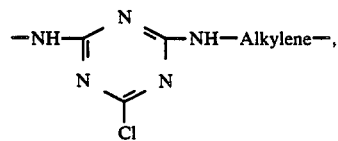

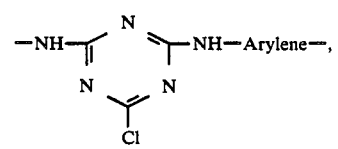

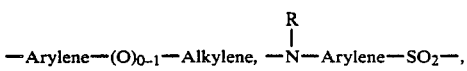

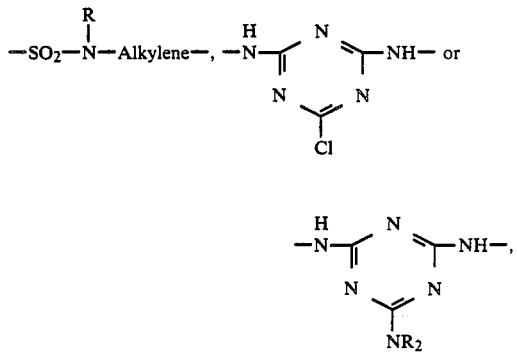

wherein

R = H or $C_1$–$C_4$-alkyl,

Alkylene = $C_2$–$C_5$-alkylene and

Arylene = unsubstituted or substituted phenylene, $R_1$, $R_2$ and $R_3$ = H—, $C_1$–$C_4$-alkyl, $C_1$–$C_4$-alkoxy, hydroxyl, halogen, carboxyl, sulphonamido, nitro, arylcarbonylamino, —$SO_3H$, —$SO_2$—CH=$CH_2$ or —$SO_2$—$CH_2$—$CH_2$—Z, wherein Z = —$OSO_3H$, —$SSO_3H$, —$OPO_3H_2$, —$OCOC_6H_5$, —$OCOCH_3$, dialkylamino, or quaternary ammonium, $R_4$ = H or $C_1$—$C_4$-alkyl which is unsubstituted or substituted by $C_1$-$C_4$-alkoxy, —$OSO_3H$, —$SO_3H$, —COOH or hydroxyl, X = A fibre-reactive radical that reacts with OH or NH groups of fibers under dyeing conditions to form covalent bonds, p = 1 or 2, q = 0 or 1, l, m and n = 0 or 1, k = 1 or 2 and Me = Cu.

2. A dyestuff according to claim 1, where K = 1 and L, m, r and q = 0.

3. A dyestuff according to claim 1, where K = 2, l and p = 1 and q and m = 0.

4. A dyestuff according to claim 1, where K, p and q = 1 and l and m = 0.

5. A dyestuff according to claim 1 of the formula

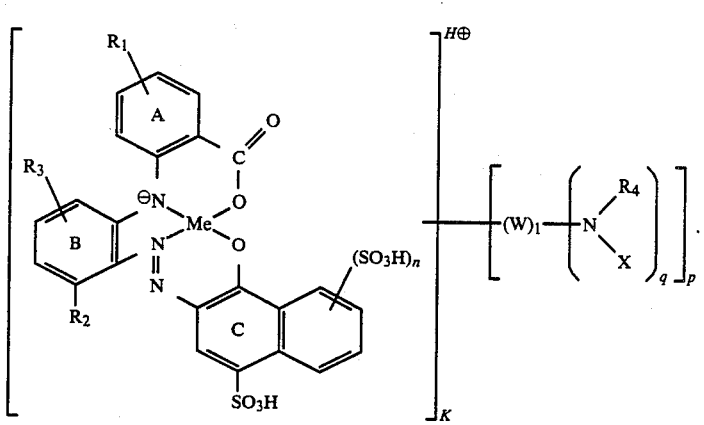

6. A dyestuff according to claim 1, of the formula

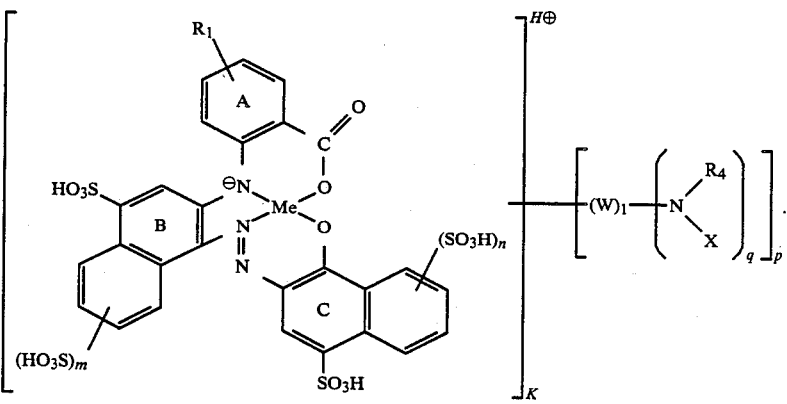

7. A dyestuff according to claim 1, of the formula

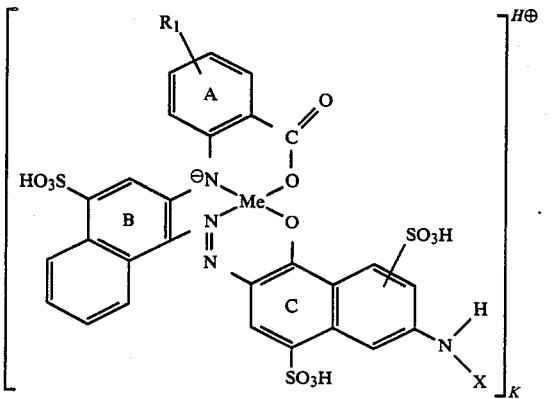

8. A dyestuff which in the form of its free acid, corresponds to the formula

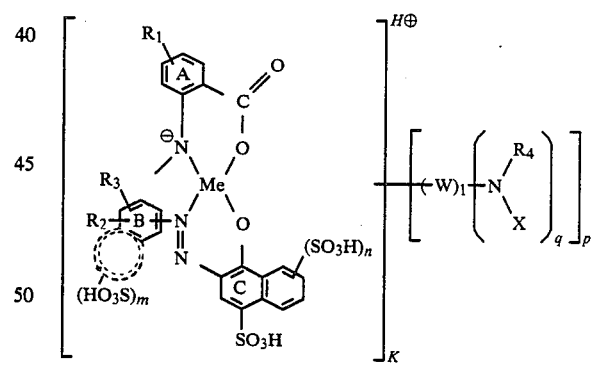

wherein
W = a direct bond or a bridge member to a C atom of the naphthalene nucleus C or the benzene nucleus A, wherein the bridge member is $$-CO-, \ -SO_2-, \ -NH-CO-NH-, \ -\overset{R}{N}-Alkylene-CO-,$$

$$-\overset{R}{N}-Alkylene-, \ -\overset{R}{N}-(CO)_{0-1}-\underset{(SO_3H)_{0-2}}{\underbrace{\phantom{XXXX}}}-,$$

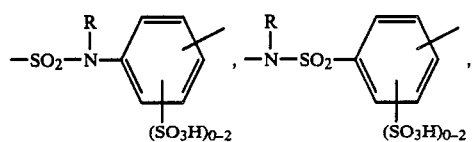

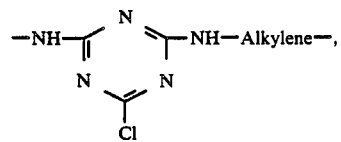

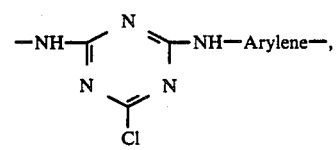

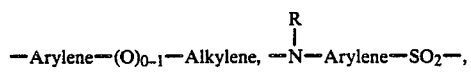

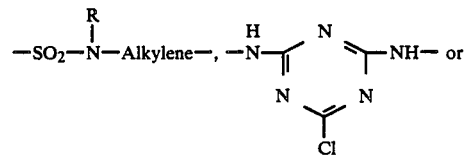

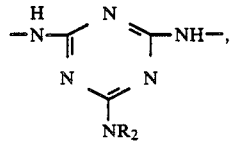

wherein
R=H or $C_1$-$C_4$-alkyl,
Alkylene=$C_2$-$C_5$-alkylene and
Arylene=unsubstituted or substituted phenylene, $R_1$, $R_2$ and $R_3$=H—, $C_1$-$C_4$-alkyl, $C_1$-$C_4$-alkoxy, hydroxyl, halogen, carboxyl, sulphonamido, nitro, arylcarbonylamino, —$SO_3H$, —$SO_2$—CH=$CH_2$ or —$SO_2$—$CH_2$—$CH_2$—Z,
wherein
Z=—$OSO_3H$, —$SSO_3H$, —$OPO_{32}$, —$OCOC_6H_5$, —$OCOCH_3$, dialkylamino, or quaternary ammonium,
$R_4$=H or $C_1$-$C_4$-alkyl which is substituted or substituted by $C_1$-$C_4$-alkoxy, —$OSO_3H$, —$SO_3H$, —COOH or hydroxyl,
X=a fibre-reactive radical selected from the group consisting of 2,4-dichlorotriazin-6-yl, monochlorotriazinyl, monofluorotriazinyl, trihalogenopyrimidiyl, monohalogenopyrimidinyl, dihalogenopyrimidinyl, vinylsulphonyl and $SO_2CH_2$—$CH_2Z$,
p=1 or 2,
q=0 or 1,
l, m and n=0 or 1,
k=1 or 2 and
Me=Cu.

* * * * *

UNITED STATES PATENT AND TRADEMARK OFFICE
CERTIFICATE OF CORRECTION

PATENT NO. : 4,777,247
DATED : October 11, 1988
INVENTOR(S) : Hermann Henk

It is certified that error appears in the above-identified patent and that said Letters Patent is hereby corrected as shown below:

| | |
|---|---|
| Title Page, Abstract, line 7 from bottom | After "hydroxyl" delete "." and substitute --,-- |
| Col. 4, line 7 | Correct spelling of --chlorotriazin-- |
| Col. 6, line 7 | After "phonyl)" insert -- - -- |
| Col. 6, line 33 | Delete "-Co-" and substitute -- -CO- -- |
| Abstract, line 3, Col. 1, line 20, Col. 9, line 5, Col. 27, line 20, Col. 30, line 48 | Delete bottom left of formula and substitute 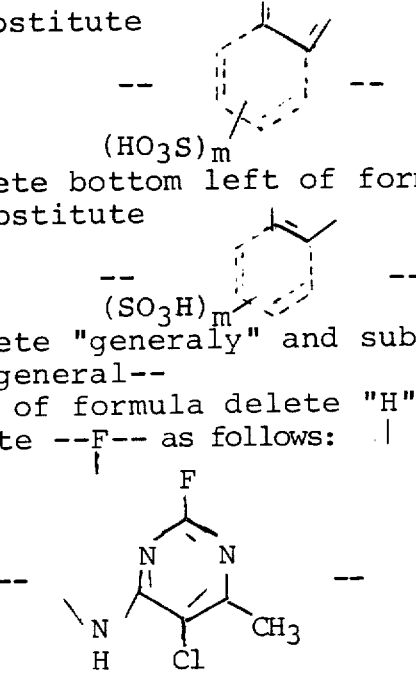 |
| Col. 9, line 23 | Delete bottom left of formula and substitute  |
| Col. 10, line 29 | Delete "generaly" and substitute --general-- |
| Col. 13, Example No. 4, formula under "C-OH" | End of formula delete "H" and substitute --F-- as follows:  |
| Col. 28, line 46 | After "X=" delete "A" and substitute --a-- |

UNITED STATES PATENT AND TRADEMARK OFFICE
CERTIFICATE OF CORRECTION

PATENT NO. : 4,777,247
DATED : October 11, 1988
INVENTOR(S) : Hermann Henk

It is certified that error appears in the above-identified patent and that said Letters Patent is hereby corrected as shown below:

Col. 32, line 18      Delete "-$OPO_{32}$," and substitute -- -$OPO_3H_2$,--

Col. 32, line 21      Delete "substituted" and substitute --unsubstituted--

Signed and Sealed this

Twentieth Day of June, 1989

Attest:

DONALD J. QUIGG

Attesting Officer      Commissioner of Patents and Trademarks